United States Patent [19]
Boxenhorn

[11] Patent Number: 4,598,585
[45] Date of Patent: Jul. 8, 1986

[54] PLANAR INERTIAL SENSOR

[75] Inventor: Burton Boxenhorn, Chestnut Hill, Mass.

[73] Assignee: The Charles Stark Draper Laboratory, Inc., Cambridge, Mass.

[21] Appl. No.: 591,007

[22] Filed: Mar. 19, 1984

[51] Int. Cl.$^4$ ............................................. G01P 15/02
[52] U.S. Cl. ..................................................... 73/505
[58] Field of Search .............. 73/505, 517 R, 517 AY, 73/518; 338/47, 43, 46; 310/329, 330, 338

[56] References Cited

U.S. PATENT DOCUMENTS

| | | | |
|---|---|---|---|
| 3,143,889 | 8/1960 | Simmons et al. | 73/505 |
| 3,444,745 | 3/1966 | Wing | 74/5.6 |
| 3,559,492 | 1/1967 | Erdley | 73/505 |
| 4,071,838 | 1/1978 | Block | 73/517 R |
| 4,095,477 | 6/1978 | Morris et al. | 73/505 |
| 4,217,787 | 8/1980 | Liebing et al. | 74/5.6 |
| 4,386,535 | 6/1983 | Albert | 73/504 |

FOREIGN PATENT DOCUMENTS

| | | | |
|---|---|---|---|
| 1283008 | 3/1966 | Fed. Rep. of Germany | 73/280 |
| 585444 | 1/1977 | U.S.S.R. | |
| 534694 | 1/1977 | U.S.S.R. | 73/517 R |

OTHER PUBLICATIONS

Petersen, K. E., "Silicon as a Mechanical Material", Proc. IEEE, vol. 70, No. 5, May, 1982.
K. Petersen et al., "Micromechanical Accelerometer Integrated with MOS Detection Circuitry38, International Electron. Devices, Technical Digest, pp. 673–675, Dec. 1980.

Primary Examiner—Stephen A. Kreitman
Attorney, Agent, or Firm—Lahive & Cockfield

[57] ABSTRACT

A planar inertial sensor includes a sheet member having one inner planar element adapted for limited angular motion about a (Y) axis perpendicular to an input (Z) axis. In a gyroscope form, the inner planar element is also adapted for limited angular motion about an (X) axis normal to and intersecting with the Y axis. The gyroscope form includes an outer driving planar element which is continuously driven in an oscillatory manner in limited excursions about the Y axis. The driving element is coupled to the inner element so that oscillatory motion of the driving element is coupled to the inner element. Position sensors provide signals representative of the angular position of the inner element relative to the X axis, which in turn are representative of angular rates impressed on the sensor about the input (Z) axis which is orthogonal to the X and Y axes. In an accelerometer form, the inner planar element is characterized by a mass imbalance across the Y axis. Position sensors provide signals representative of the angular position of the inner element, which in turn are representative of the acceleration of the sensor in the direction of the input (Z) axis.

30 Claims, 6 Drawing Figures

PLANAR INERTIAL SENSOR

BACKGROUND OF THE INVENTION

This invention relates to inertial sensors, and in particular to accelerometers and vibratory gyroscopes.

Vibratory gyroscopes provide a measure of an angular rate impressed on a vibrating element by producing a signal representative of torques on the vibratory element due to the impressed angular rate.

In the prior art, vibratory gyroscopes use a tuning fork or vibrating beam, or wire, as the vibrating element. However, because of the discrete nature of such elements, the prior art gyroscopes have not proven to be easily adapted to miniaturization, or mass production.

It is an object of this invention to provide an inertial sensor adapted for small geometry configurations.

Another object is to provide an inertial sensor which may be easily constructed, using mass production techniques.

SUMMARY OF THE INVENTION

Briefly, the invention is an inertial sensor having an input (Z) axis. The sensor includes a sheet member and an associated base member. The base member is adapted to support the peripheral region of the sheet member in a plane perpendicular to the Z axis, where that plane includes a first (X) reference axis and a second (Y) reference axis, and where the X and Y axes are mutually perpendicular intesecting with the X axis at a common point. The sheet member encloses a first pair of opposed C-shaped void regions disposed symmetrically about the Y axis and the common point. The portions of the sheet member between the opposed ends of the void regions are flexible, providing flexures.

In the accelerometer form of the invention, the portion of the sheet member interior to the void regions has a mass imbalance across the Y axis, i.e., one side has more mass than the other. Sensors are adapted to provide signals representative of the angular position of the interior position of the sheet member about the Y axis. Those signals are representative of the acceleration of the sensor in the direction of the Z axis. In some forms, those signals may be used to drive torgers which dynamically maintain the interior element of the sheet member in the X-Y plane, where the return torques are representative of the sensor acceleration.

In general, in the gyroscope form of the invention a generally planar gyroscope is arranged to produce, in combination, an oscillatory momentum vector and a measurable oscillatory torque output in response to an impressed angular input.

In preferred embodiments, the sheet member of gyroscope has at least one planar inner element arranged to oscillate about the Y axis at a selected frequency. The inner element is also arranged to tilt about the X axis in response to an angular rate impressed about the input (Z) axis. The gyroscope has at least one outer planar driving element, arranged to be driven in an oscillatory manner with limited excursions about the Y axis at the selected frequency (driven, for example, by an electrostatic or electromagnetic forcer). The driving element is coupled to the inner element so that the oscillatory motion of the driving element is coupled to the inner element. Position sensors provide signals representative of the angular position of the inner element relative to X axis, which in turn are representative of angular rates impressed on the device about the Z axis. In various embodiments, the vibratory gyroscope may have a plurality of inner elements coupled to its driving element, or alternatively have a single inner element coupled to its driving element.

The planar geometry of the invention permits inertial sensors to be produced from sheets of material using inexpensive mass production techniques. In some embodiments, the sensors may be formed by stamping a single sheet of material such as steel or aluminum. In other embodiments, minature inertial sensors may be constructed from a thin layer of a dielectric material (such as $SiO_2$, $Si_3N_4$, or $(SiO_2)_x(Si_3N_4)_y$) on a silicon substrate using conventional semiconductor etching techniques. Particularly using the latter technique, many minature small geometry inertial sensors may be constructed on a single semiconductor chip, permitting the economic use of redundant inertial sensors with consequent greatly improved reliability and performance for inertial guidance systems. Further, the size geometry of the inertial sensors of the present invention permits the use of electrostatic control by which relatively low voltage signals can provide relatively large driving forces and output signals.

BRIEF DESCRIPTION OF THE DRAWING

The foregoing and other objects of this invention, the various features thereof, as well as the invention itself, may be more fully understood from the following description, when read together with the accompanying drawings in which.

DESCRIPTION OF THE PREFERRED EMBODIMENT

Figures 1, 2, 3, 4:
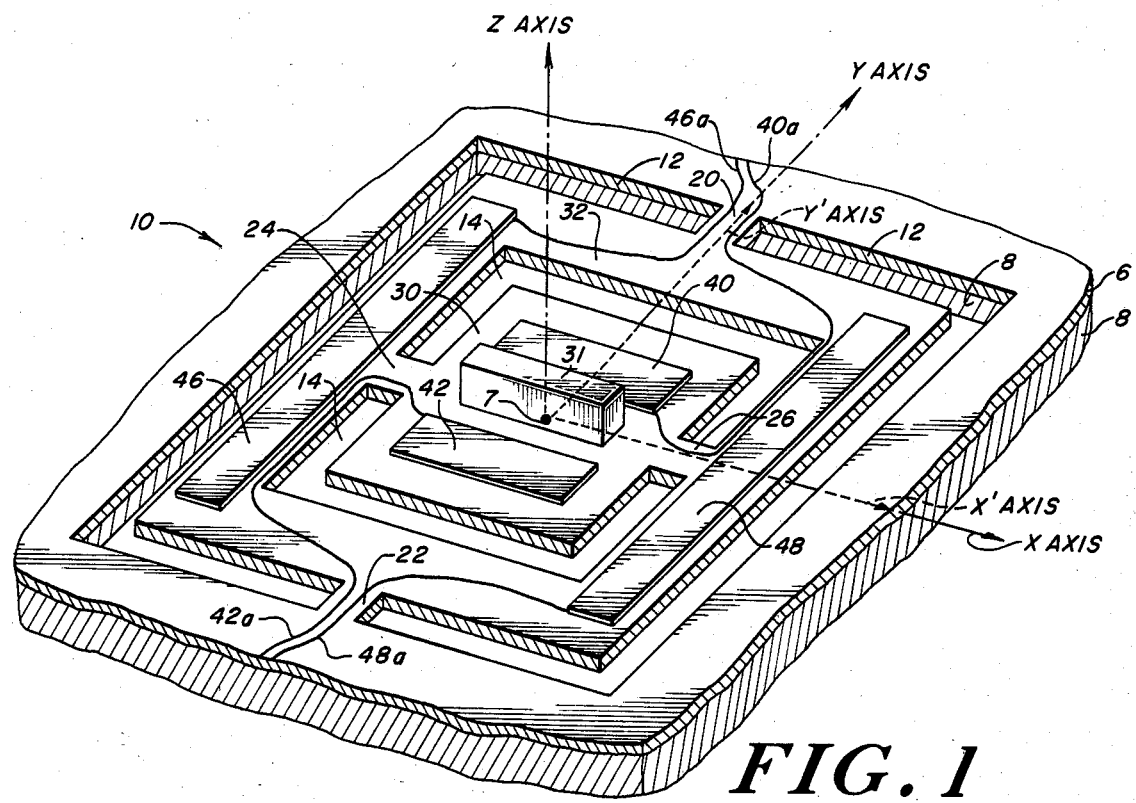
FIG. 1 is a perspective view of an planar inertial sensor embodying the present invention in the form of a vibratory gyroscope.
FIG. 2 is a cross-sectional view of the embodiment of FIG. 1, taken along the X axis.
FIG. 3 is a cross-sectional view of the embodiment of FIG. 1, taken along the Y axis.
FIG. 4 shows the drive waveforms for the drive element of the gyroscope of FIGS. 1-3.

FIGS. 1-3 shows a gyroscope 10 in accordance with the present invention. The gyroscope 10 includes a nominally planar, relatively thin sheet member 6 with its perimeter being positioned in a plane defined by perpendicular intersecting reference axes X and Y. An input (Z) axis orthogonal to the X and Y axes, intersects those axes at a common point 7. The sheet member 6 is supported at the edges of gyroscope 10 so that the portions of sheet member 6 interior to those edges is positioned over and spaced apart from a substrate (or base member) 8. In alternate embodiments, the base member may not underlie the sheet member 6, except at the peripheral supports.

In the preferred embodiment, the sheet member 6 includes a first pair of opposed, C-shaped void regions 12 and a second pair of opposed, C-shaped void regions 14. The term "C-shaped" refers generally to the shape of the respective regions each of which includes a portion extending approximately 180 degrees about a central point (for example, "C-shaped" includes a semi-circle, which extends 180 degrees about its center; C-shaped also includes two linear segments joined at their ends, like a "V"). In the illustrated embodiment, the void regions of pair 12 are substantially congruent, as are the void regions of pair 14. The void regions 12 are larger than the void regions of pair 14, with the void regions of pair 12 being disposed symmetrically about the Y axis and the common point 7, and the void regions of pair 14 being disposed symmetrically about the X-axis and common point 7. In other forms of the invention, it is necessary that the opposed void regions be congruent.

The portions of the sheet member 6 between the opposed ends of the void regions of pair 12 (denoted by reference designations 20 and 22 in FIG. 1) and the portions of the sheet member 6 between the opposed ends of the void regions of pair 14 (denoted by reference designations 24 and 26 in FIG. 1) are relatively flexible, forming a flexure joining the portion of member 6 exterior to the void regions 14, with the portion interior to the void region 14. Consequently, the sheet member on one side of each of those portions is coupled to the sheet member on the other side of the respective portions in a manner permitting limited rotational motion of one side with respect to the other side about the axis passing through those portions.

With this configuration, the void regions of pair 14 and flexure portions 24 and 26 of sheet 6 define an inner, or inertial, element 30; that is, the element 30 is generally interior to the void regions of the first pair 14. The portion of sheet 6 bounded by the void regions of pair 12, flexure portions 20 and 22, the void regions of pair 14, and flexure portions 24, 26 define a driving element 32 of the gyroscope 10; that is, the element 32 is generally interior to the void regions of pair 12. The driving element 32 may undergo limited angular displacements about the Y-axis with respect to the perimeter of sheet 6 (which is supported at its edges by base member 8) as permitted by the flexure portions 20 and 22. Similarly, the inner element 30 may may undergo limited angular displacements about the X-axis with respect to the driving element 30 as permitted by the flexure portions 24 and 26.

With this configuration, the driving element 32 is generally planar, lying in a plane defined by the Y axis and an X' axis (which is perpendicular to and intersects the Y axis at the common point 7. The inner element 30 is also generally planar, lying in a plane defined by the X' axis and a Y' axis (which is perpendicular to and intersects the X' axis at the common point 7). In FIGS. 1-3, the X and X' axes are shown to be coaxial as are the Y and Y' axes. However, in operation, the X' axis is angularly offset with respect to the X axes in a generally periodic manner, and the Y' axis is angularly offset with respect to the Y axis in a manner related to an angular rate impressed on gyroscope 10.

In the present embodiment, inner element 30 includes an elongaged bar 31 on its surface extending in the X' direction. as discussed below, this bar 31 is merely on exemplary form for attaining a desired relation between the moments of inertia of element 30 about the X'Y' and Z' axes which are necessary to provide a desired sensitivity of gyroscope 10.

Generally the sheet member 6 is electrically non-conductive. As shown, the inner element 30 includes electrically conductive sensitive regions 40 and 42 on the upper surface of that element 30. In alternative embodiments, the regions 40 and 42 may be positioned on the lower surface of element 30, or in both the upper and lower surfaces of that element 30. The regions 40 and 42 are electrically connected to external electrical circuitry by conductive paths (denoted by reference designations 40a and 42a). The sensing regions 40 and 42 are adapted to oppose planar conductive elements fixed with respect to the base member 8. Where the base member 8 is electrically conductive, that member 8 may establish the conductive element opposite to regions 40 and 42. (In other embodiments, discrete conductive members may be fixed with respect to member 8). Together, the pairs of opposed conductive elements provide a capacitive pick-off position transducer having a capacitance representative of the angular orientation of the inner element 30 about the X-axis (i.e. the angle formed by the Y and Y' axes).

The drive member 32 includes two conductive drive regions 46 and 48 on its upper surface. As with regions 40 and 42 in alternate embodiments, regions 46 and 48 may be on the lower surface of element 32, or on both the upper and lower surfaces of element 32. The regions 46 and 48 are electrically connected to external circuitry by conductive paths (denoted by reference designations 46a and 48a). The drive regions 46 and 48 are adapted to oppose planar conductive elements fixed with respect to the base member. Where the member 8 is conductive, that member may serve as the conductive elements opposite elements 46 and 48. Together, those pairs of opposed elements may be selectively controlled to provide electrostatic forces for driving the drive element 32 in oscillatory motion about the Y-axis (i.e. so that the angle formed by the X' and X axes is an oscillatory function of time).

A signal generator is adapted to provide a first drive signal (which is applied across the capacitor formed by drive region 46 and its opposing conductive driving element), and a second drive voltage (which is applied across the capacitor formed by drive region 48 and its opposing conductive driving element). The first and second drive voltage signals are periodic and have the same fundamental frequency (and, thus identical periodicity), and a non-zero d.c. component, where the first drive boltage signal is shifted in phase by 180 degrees with respect to the second drive voltage signal. FIG. 4 shows exemplary drive voltage signals which are generally rectangular. If bipolar signals are used, those signals are assymetric, e.g., as shown in FIG. 4.

In operation, the drive signal, alternating electrostatic forces between the conductive elements of the respective capacitors, and, is responsive to these forces, the drive element 32 oscillates about the Y-axis at the repetition frequency of the voltage driving signals. This oscillatory motion of the driving member 32 is coupled to the inner element 30 (which in turn also oscillates about the Y axis) by way of the flexure portions 24 and 26. In small geometry configurations, where the distances between regions 46 and 48 and their associated opposed conductive elements are small, substantial electrostatic forces may be developed using relatively low driving voltages. In alternative forms of the invention, corresponding oscillatory motion of elements 30 and 32 about the Y axis may be established by other techniques, for example using electromagnetic forces.

With the elements 30 and 32 oscillating in that manner, thereby establishing an oscillatory momentum vector, an impressed angular rate about the Z axis causes a gyroscope torque which tilts the inner element 30 out of the plane of the drive element 32 by an angle (corresponding to the angle between the Y and Y' axes) proportional to the magnitude of the impressed angular rate.

The sensitivity of the gyroscope 10 at resonance is approximately:

$$\theta_{1x} = \frac{\theta_{2y}(I_{1x} + I_{1y} - I_{1z})/I_{1x}}{2w_n DR_{1x}} W_z$$

where $\theta_{1x}$ is the tilt of inner element 30 measured with respect to the X-Y plane:

$I_{1x}$ is the moment of inertia of the inner element 30 about the X' axis;

$I_{1y}$ is the moment of inertia of inner element 30 about the Y' axis;

$I_{1z}$ is the moment of inertia of inner element 30 about the Z' axis;

$\theta_{2y}$ is the maximum angular displacement of the drive element 32 about the Y axis;

$w_n$ is the resonant frequency of inner element 30 about X' axis;

$DR_{1x}$ is the damping ratio of the inner element 30;

$W_z$ is the angular input rate about the Z-axis.

Thus, the sensitivity proportional to $(I_{1x}+I_{1y}-I_{1z})/I_{1x}$, where $I_{1x}$, $I_{1y}$ and $I_{1z}$ are the moments of inertia of the inner element 30 about the X', Y'0 and Z'0 axes, respectively. In order to maximize sensitivity, the inner element 30 should be shaped to maximize that relation of the moments of inertia. In the illustrated embodiment of FIGS. 1–3 (where element 20 is a thin sheet), a bar 31 extending along the X' axis is positioned on element 30. In other embodiments, the element 30 may be alternately shaped, particularly to provide the relation of the X', Y' and Z' moments of inertia to attain a desired sensitivity.

In a preferred form of the invention, by way of example, the gyroscope 10 has the general configuration shown in FIGS. 1–3, where the sheet member 6 is a 1.0 micron thick layer of silicon dioxide supported at its edges by a silicon substrate 8. The central portion of sheet member 6 (including inner element 30 and drive element 32) is separated from the substrate 8 by 8.7 microns in the Z direction (shown as dimension D in FIGS. 2 and 3). The inner element 30 is rectangular having dimensions 125 microns (in the Y direction) by 125 microns (in the X direction), and the bar 31 (centered over the X axis) is gold and has dimensions of 15 microns in the Z' direction, 12.5 microns in the Y' direction and 105 microns in the X' direction. The drive element 32 is substantially a 50 micron wide "rectangular annulus" (as shown), having outer dimensions 250 microns by 250 microns, where the regions 46 and 48 are each 125 microns (in the Y direction) by 40 microns (in the X direction). With this configuration, a 10 volt driving voltage at a frequency 1000 Hz produces an output sensitivity of approximately 46 millivolts/rad-sec with an output angle ($\theta_{1x}$/W) of 4 acr-min/rad/sec.

In the preferred embodiment, the gyroscope 10 is constructed from a p type silicon wafer typically 300 microns thick using conventional photolithography and semiconductor processing operations. A high concentration boron (p+) diffusion is made in those areas where an etch stop is required. Next an eptaxial layer is grown approximately 10 microns in thickness. The thickness of this layer determines the spacing from the sheet layer 6 to the substrate 8. At this point on chip electronics are fabricated on a remote area of the substrate. Next the sheet layer 6 is thermally grown to about a thickness of 1 micron by oxidizing the surface of the epitaxial layer. Several steps of selective growth, etch back, and regrowth are required to obtain the desired flexure thickness of the various regions of sheet layer 6, which contains the inner element 30, the drive element 32, and flexures 20, 22, 24 and 26. The bar 31 is constructed subsequently using plating or other techniques.

The wafer is then coated with metal (typically chromiun-gold) and patterned to form electrodes 40, 42, 46, 48 and metal connections to the on-chip circuitry. The next step is to pattern and etch through layer 9 (SiO$_2$) to form the C-shaped void regions. The wafer is then etched in a resistivity dependant etch (for example, ethelene diamine pyrochatecol and water). This etchant etches through the epitaxial layer stopping at the p+ substrate diffusion and leaving the SiO$_2$ plate 6 suspended by the region 22 and 24. The wafer is cleaned, dryed and sawn apart to form individual gyroscope elements. These elements may then be conventionally packaged, with the on-chip circuitry being wire bonded to the package leads.

In alternative embodiments, a separate cap member may be positioned over and spaced apart from sheet member 6 and joined to sheet member where that member is supported by base member 8. In this configuration, drivers and sensors (electromagnetic or electrostatic) may be established in a similar manner to that described above, so that the inertial sensor may operate with the sheet member dynamically restrained to the X-Y plane.

In other alternative embodiments, the sheet member 6 may be stamped from a single sheet material, such as aluminum or steel, affixed at its edges to a peripheral support element. In this form, the bar 31 can be from a portion of the sheet member which is bent 90 degrees out-of-plane, or by attaching a suitable shaped member. The drives or sensors, or both types of elements may be either capacitive or electromagnetic, or mixed.

It will be understood that in the semiconductor material embodiment of the invention, additional circuitry may be incorporated in the semiconductor wafer (or chip) using conventional integrated circuit techniques, providing a small geometry planar vibratory gyroscope with integral supporting electronic circuitry. In such configurations, highly efficient packaging may be attained. Moreover, multiple gyroscopes may be constructed and interconnected on a single wafer (or chip) with circuitry adapted to permit redundant operation, thereby increasing overall system reliability.

Figure 5:
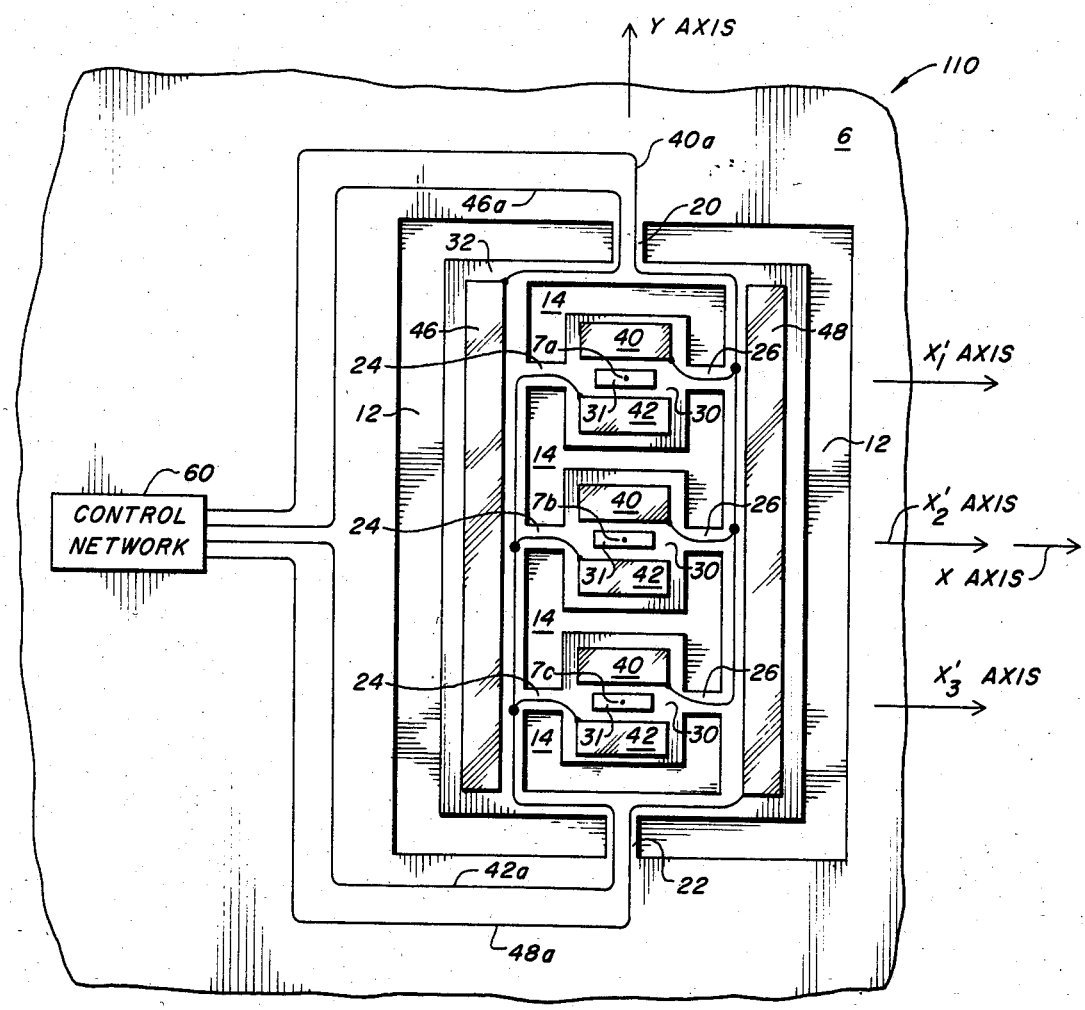
FIG. 5 is a plan view of another embodiment of the invention.

FIG. 5 shows a plan view of an alternative embodiment 110 of the present invention. The gyroscope 110 is generally similar to the embodiment of FIG. 1 except that the drive member includes three inner members, each arranged to tilt about one of three parallel (X'$_1$, X'$_2$, X'$_3$) axes which are all perpendicular to the Y axis and intersect that axis at a respective one of central points 7a, 7b and 7c. In alternative embodiments, a different number of inner members may be used. In FIG. 5, elements corresponding to elements in the FIG. 1 configuration are denoted by identical reference designations. Further, the portion of substrate 8 underlying the void regions 12 and 14 is shown with cross-hatched lines. As illustrated in FIG. 5, the drive element 32 (and thus the X'$_1$, X'$_2$, and X'$_3$ axes) and the inner element 30

(and thus the entire sheet number 6) are illustrated in the X-Y plane, although in operation, these elements are generally angularly offset from the illustrated position.

In the configuration of FIG. 5, each of the inner elements 30 is defined by a pair of opposed C-shaped void regions disposed symmetrically about one of the three central points (7a, 7b and 7c) and one of the X'$_1$, X'$_2$, and X'$_3$ axes (as shown). It will be understood that as defined herein, the term "C-shaped" includes the void regions having the illustrated cross-hatched which defines the innermost inner member 30 in FIG. 5. In gyroscope 110, the three conductive path 46 are connected together by conductive path 46a to establish (together with the underlying conductive substrate 8) three parallel capacitive pick-offs. The three conductive regions 48 are similarly connected to conductive path 48a. With this configuration, the capacitive pick-offs are highly sensitive to angular input rates about axes parallel to an axis perpendicular to the Y axis and the X axis. p As shown in FIG. 5 the conductive regions 40a, 42a, 46a and 48a are connected to the central network 60 (which may be integrated into the chip using conventional integrated circuit technology) which controls the operation of gyroscope 110.

Figure 6:
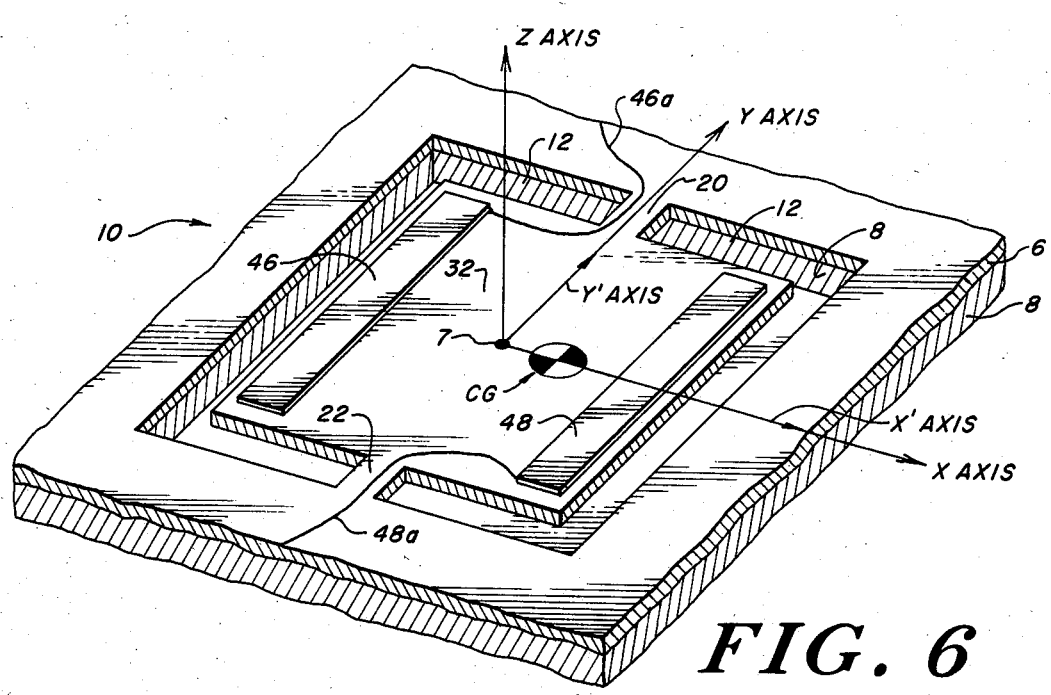
FIG. 6 is a plan view of a planar inertial sensor embodying the present invention in the form or an accelerator.

FIG. 6 shows yet another inertial sensor according to the present invention, in the form of an accelerometer 50. Accelerometer 60 is similar to the gyroscope 10 of FIG. 1, except that there are not elements corresponding to void regions 12, regions 20, 22 and conductive regions 46, 46a, 48, and 48a, and except that element 30 has more mass on the portion on one side of the X axis then on the other (establishing a mass imbalance about the X axis). This mass imbalance is indicated by the center of gravity CG symbol in FIG. 6. Otherwise, the elements of acceleometer 60 are the same as in gyroscope 10. In operation, the angular displacement of element 30 about the X axis, as sensed using conductive regions 40 and 42, provides a measure of the acceleration along the Z axis. In this embodiment, the X and Y axes are interchangeable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraces therein.

What is claimed is:

1. A planar inertial sensor having an input (Z) axis, comprising a sheet member and associated base member, said base member including means for supporting the peripheral region of said sheet member in a plane perpendicular to said input (Z) axis, said plane including a first (X) reference axis and a second (Y) reference axis, said first and second reference axes being mutually perpendicular and intersecting said input axis at a common point, wherein said sheet member encloses a first pair of opposed C-shaped void regions and said first pair of void regions being disposed symmetrically about said second axis and said common point, wherein the portions of said sheet member between the opposed ends of the void regions of said first pair and the portions of said sheet member interior to said first pair of void regions are spaced apart in the direction of said Y axis from said base member, and wherein the portions of said sheet member between the opposed ends of said void regions of said first pair are flexible, whereby said common point is constrained to be substantially in said plane, and further comprising means for sensing inertial changes in position of said support means.

2. A planar inertial sensor according to claim 1 further comprising:
(A) at least one second pair of opposed C-shaped void regions, the void regions of said first pair being larger than the void regions of said second pairs, and
(B) said second pair of void regions being interior to the void regions of said first pair and being disposed symmetrically about axes parallel to said first axis when said sheet member lies in said plane.

3. A planar inertial sensor according to claim 2 including a single second pair of opposed C-shaped void regions, said single second pair being disposed about said common point wherein the portion of said sheet member interior to said second pair of void regions includes an inner element axis perpendicular to said Y axis and passing through said common point.

4. A planar inertial sensor according to claim 3 further comprising:
means for generating a signal representative of the angular displacement of the portion of said sheet member interior to said second pair of void regions about said first reference axis, said signal being representative of the angular rate of said sensor about said input axis.

5. A planar inertial sensor according to claim 4 wherein said generating means includes a first sensing planar conductive region on the surface of the portion of said sheet member interior to said second pair of void regions and on one side of said inner element axis, said first sensing planar conductive region being adapted to oppose a first sensing planar conductive element fixed with respect to said base member, said first sensing planar conductive region and said first sensing planar conductive element forming a position transducer having a characteristic capacitance representative of the angular orientation of said portion of said sheet member interior to said second pair of void regions about said first reference axis.

6. A planar inertial sensor according to claim 5 wherein said generating means further includes a second sensing planar conductive region on the surface of the portion of said sheet member interior to said second pair of void regions and on the other side of said inner element axis, said second sensing planar conductive region being adapted to oppose a second sensing planar conductive element fixed with respect to said base member, said second sensing planar conductive region and said second sensing planar conductive element forming a position transducer having sensing a characteristic capacitance representative of the angular orientation of said portions of said sheet member interior to said second pair of void regions about said first reference axis.

7. A planar inertial sensor according to claims 3 further comprising:
driving means for driving the portion of said sheet member between said first and second pairs of void regions in an oscillatory motion about said second axis.

8. A planar inertial sensor according to claim 7 wherein said driving means includes a first driving planar conductive region on the surface of the portion of said sheet member between said first and second pairs of void regions and on one side of said second reference axis, and a second driving planar conductive regions on the surface of the portion of said sheet member between said first and second pairs of void regions and on the other side of said second reference axis, said first and second driving planar conductive regions being adapted to oppose first and second driving planar conductive elements, respectively, fixed with respect to said base member.

9. A planar inertial sensor according to claim 8 wherein said driving means further includes means for applying a first periodic voltage signal across said first driving planar conductive region and said first driving planar conductive element, and means for applying a second periodic voltage signal across said second driving planar conductive region and said second driving planar conductive element, said first and second voltage signals having the same fundamental frequency and a non-zero d.c. component, and said first voltage signal being shifted in phase by 180 degrees with respect to said second voltage signal.

10. A planar inertial sensor according to claim 4 further comprising:
   driving means for driving the portion of said sheet member between said first and second pairs of void regions in an oscillatory motion about said second axis.

11. A planar inertial sensor according to claim 2 including a plurality of second pairs of opposed, C-shaped void regions, each of said second pairs being disposed symmetrically about an associated central point along said Y axis, wherein the portions of said sheet member interior to said second pairs of void regions each include an inner element axis perpendicular to said Y axis and passing through a central point associated with said inner element.

12. A planar inertial sensor according to claim 11 further comprising:
   means for generating a signal representative of the angular displacement of the portion of said sheet member interior to said second pair of void regions about said first reference axis, said signal being representative of the angular rate of said gyroscope about said input axis.

13. A planar inertial sensor according to claim 12 wherein said generating means includes a first sensing planar conductive region on the surface of the portion of said sheet member interior to each of said second pairs of void regions and on one side of its respective inner element axis, each of said first sensing planar conductive regions being adapted to oppose a first sensing planar conductive element fixed with respect to said base member, said first sensing planar conductive regions and said first sensing planar conductive elements forming position transducers having a characteristic capacitance representative of the angular orientation of said portions of said sheet member interior to said second pairs of void regions about said first reference axis.

14. A planar inertial sensor according to claim 13 wherein said generating means further includes a second sensing planar conductive region on the surface of the portion of said sheet member within each of said second pairs of void regions and on the other side of its inner element axis, said second sensing planar conductive regions being adapted to oppose second sensing planar conductive elements fixed with respect to said base member, said second sensing planar conductive regions and said second sensing planar conductive elements forming a position transducer having sensing a characteristic capacitance representative of the angular orientation of said portions of said sheet member within said second pair of void regions about said first reference axis.

15. A planar inertial sensor according to claim 12 further comprising:
   driving means for driving the portion of said sheet member between said first and second pairs of void regions in an oscillatory motion about said second axis.

16. A planar inertial sensor according to claim 11 further comprising:
   driving means for driving the portion of said sheet member between said first and second pairs of void regions in an oscillatory motion about said second axis.

17. A planar inertial sensor according to claim 16 wherein said driving means includes a first driving planar conductive region on the surface of the portion of said sheet member between said first and second pairs of void regions and on one side of said second reference axis, and a second driving planar conductive regions on the surface of the portion of said sheet member between said first and second pairs of void regions and on the other side of said second reference axis, said first and second driving planar conductive regions being adapted to oppose first and second driving planar conductive elements, respectively, fixed with respect to said base member.

18. A planar inertial sensor according to claim 17 wherein said driving means further includes means for applying a first periodic voltage signal across said first driving planar conductive region and said first driving planar conductive element, and means for applying a second periodic voltage signal across said second driving planar conductive region and said second driving planar conductive element, said first and second voltage signals having the same fundamental frequency and a non-zero d.c. component, said first voltage signal being shifted in phase by 180 degrees with respect to such second voltage signal.

19. A planar inertial sensor according to claim 1 or 10 or 15 wherein said sheet member and associated base member are constructed from an integral material.

20. A planar inertial sensor according to claim 19 wherein said integral material is a semiconductor wafer, said sheet member being a dielectric layer and said base member being silicon, said sheet member overlying said base member.

21. A planar inertial sensor according to claim 20, wherein said dielectric layer is a material from the group consisting of $SiO_2$, $Si_2N_4$, and $(SiO_2)_x(Si_3N_4)_y$.

22. A planar inertial sensor according to claim 19 further comprising associated electrical control circuitry integrated with said silicon wafer.

23. A planar inertial sensor according to claim 19 wherein said base member includes a portion underlying said sheet member and wherein the portions of said sheet member between the opposed ends of the void regions of said first pair and the portions of said sheet member interior to said first pair of void regions are spaced apart in the direction of said Y axis from said base member.

24. A planar inertial sensor according to claim 1 wherein the portion of said sheet member between the ends of said void regions of said first pair is imbalanced across said second axis.

25. A planar inertial sensor according to claim 24 further comprising:
  means for generating a signal representative of the angular displacement of the portion of said sheet member interior to said first pair of void regions about said second reference axis, said signal being representative of the acceleration of said sensor in the direction of said input axis.

26. A planar inertial sensor according to claim 25 wherein said sheet member and associated base member are constructed from an integral material.

27. A planar inertial sensor according to claim 26 wherein said integral material is a semiconductor wafer, said sheet member being a dielectric layer and said base member being silicon, said sheet member overlying said base member.

28. A planar inertial sensor according to claim 27, wherein said dielectric layer is a material from the group consisting of $SiO_2$, $Si_2N_4$, and $(SiO_2)_x(Si_3N_4)_y$.

29. A planar inertial sensor according to claim 26 further comprising associated electrical control circuitry integrated with said silicon wafer.

30. A planar inertial sensor according to claim 26 wherein said base member includes a portion underlying said sheet member and wherein the portions of said sheet member between the opposed ends of the void regions of said first pair and the portions of said sheet member interior to said first pair of void regions are spaced apart in the direction of said Y axis from said base member.

* * * * *